Feb. 18, 1964 F. A. HILL 3,121,341
GEARS WITH RIGID MOLDED SURFACES
Filed May 25, 1960 3 Sheets-Sheet 1

*Francis A. Hill*
INVENTOR.

Feb. 18, 1964   F. A. HILL   3,121,341
GEARS WITH RIGID MOLDED SURFACES
Filed May 25, 1960   3 Sheets-Sheet 2
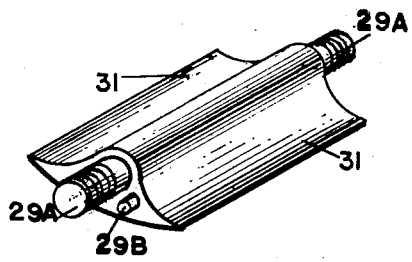
FIG. 6.
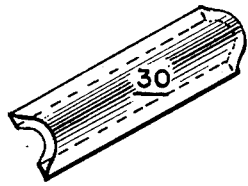
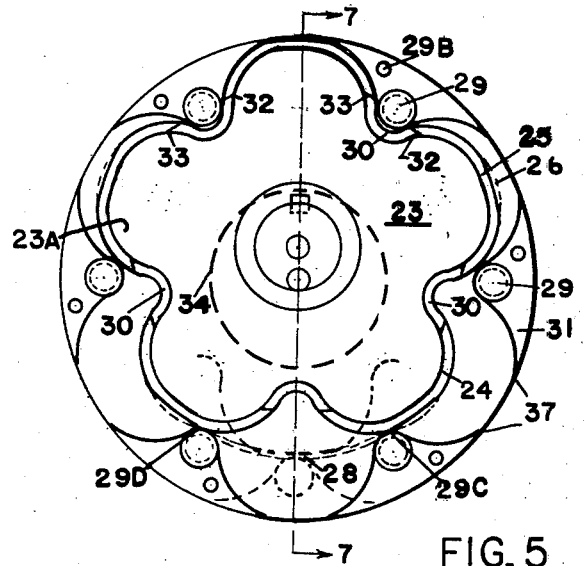
FIG. 5.
FIG. 8.
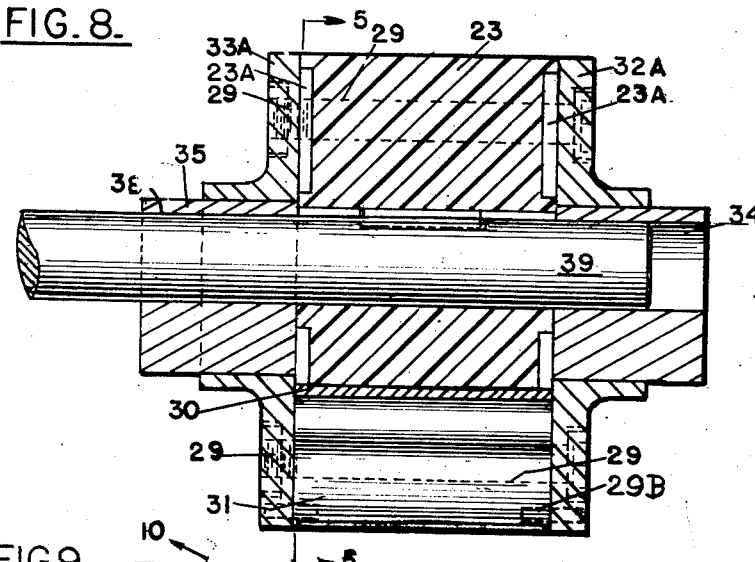
FIG. 7.
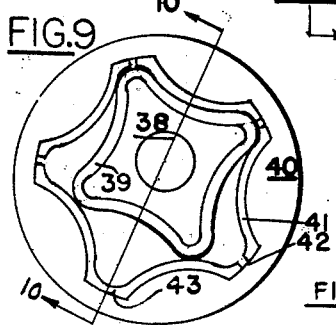
FIG. 9.
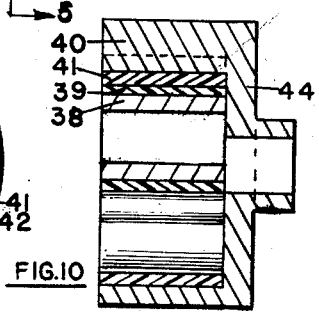
FIG. 10.
*Francis A. Hill*
INVENTOR.

Feb. 18, 1964  F. A. HILL  3,121,341
GEARS WITH RIGID MOLDED SURFACES
Filed May 25, 1960  3 Sheets-Sheet 3

*Francis A. Hill*
INVENTOR.

United States Patent Office 3,121,341
Patented Feb. 18, 1964

3,121,341
GEARS WITH RIGID MOLDED SURFACES
Francis A. Hill, Westport, Conn.
(420 Palm Circle E., Naples, Fla.)
Filed May 25, 1960, Ser. No. 31,699
1 Claim. (Cl. 74—462)

My invention relates to internal gears used in liquid pumps, gas compressors, liquid motors, air motors and combustion engines.

In Hill Patents Nos. Re. 21,316 and 2,666,336 internal gears are described having tooth contours maintaining continuous fluid tight engagements between the teeth of one gear and those of the other gear at steady angular velocity while performing pressure functions.

To manufacture gear teeth with theoretically perfect curvatures is very expensive. It requires a major investment in production tools.

One of the objects of my invention is to provide gears with satisfactory tooth curvatures at moderate cost.

Another object of my invention is to limit the driving range of one tooth of one gear against another tooth of the other gear to the full mesh tooth engagement region, while maintaining fluid pressure holding engagements necessary for separating one gear chamber from the next.

A third object of my invention is to provide gears having tooth surfaces of rigid molded material suitable for different fluids, different pressures and different temperatures.

Other objects of my invention will be mentioned in the following description. In the figures:

FIGURE 5 is a view of FIG. 7 on line 5—5 showing a set of Gerotor gears with composite outer gear teeth and inserts in the tooth spaces of the inner gear.

FIG. 6 shows an outer gear tooth made of composite material.

FIGURE 7 is a section of FIGURE 5 on line 7—7.

FIGURE 8 shows a tooth space insert in FIGS. 5 and 7.

FIGURE 9 shows a pair of Gerotors having 4 and 5 teeth respectively with both sets of teeth and tooth spaces composed of rigid moldable material.

FIGURE 10 is a section of FIG. 9 on line 10—10.

Figure 11:
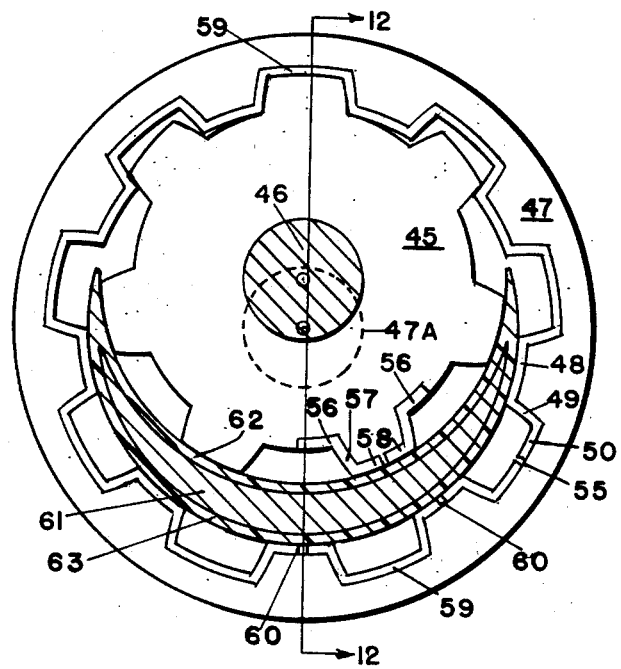
Figure 12:
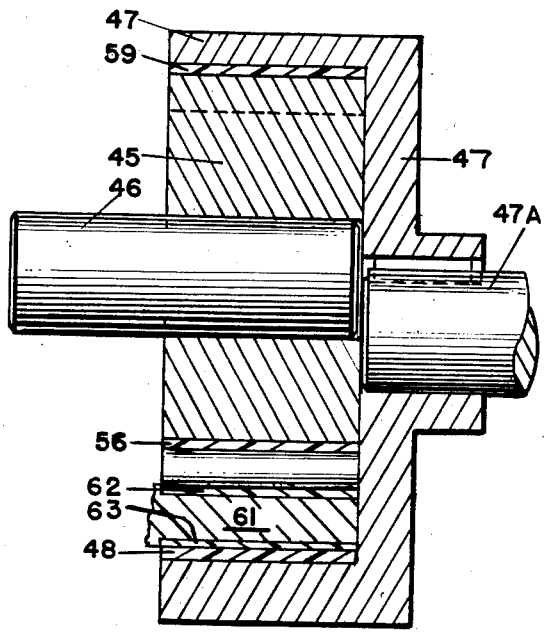

FIGURE 11 is a left hand view of FIG. 12 showing a 7 tooth gear inside a 9 tooth gear crescent filling the region of no tooth engagement. The outer gear teeth and tooth spaces have their surfaces composed of rigidly setting moldable material. Also the crescent has its inner and outer surfaces covered with moldable material.

FIGURE 12 is a section of FIGURE 11 on line 12—12.

Figure 1:
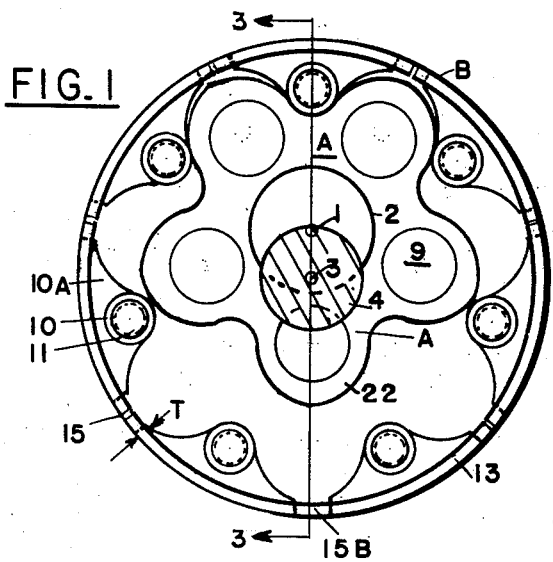
FIGURE 1 is a left hand view of FIG. 3 with the end plate removed. It shows an inner gear of metal and an outer gear with metallic teeth and concave molded tooth flanks.
Figure 3:
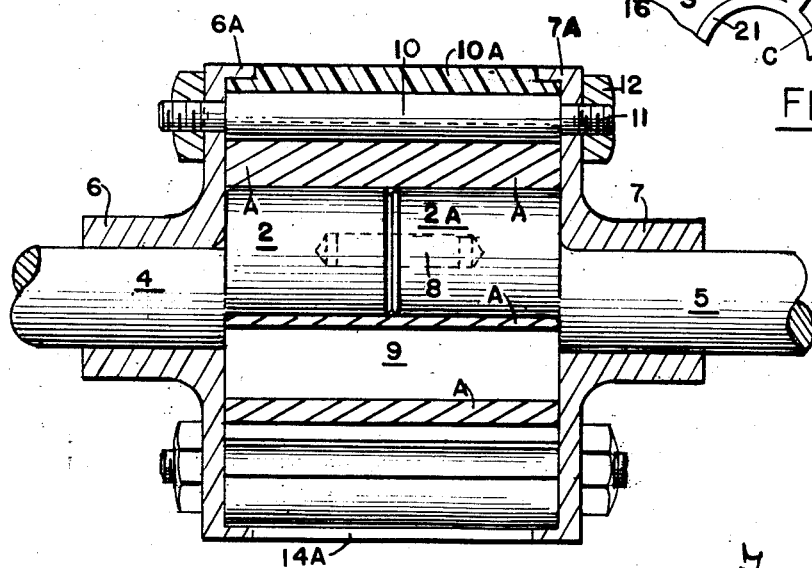
FIGURE 3 is a section of FIGURE 1 on line 3—3.

In FIG. 1 the inner gear A has 5 teeth and the outer gear B has 7 teeth. Gear A is centered at 1 and rotates on the journals 2 and 2A (FIG. 3). The outer gear B is centered at 3 and has end plate 6 and 7 journalled on shafts 4 and 5 whose axes coincide with the center 3. In this construction the eccentric journals 2 and 2A are homogeneous with shafts 4 and 5 respectively. A pin 8 shown in dotted lines in FIG. 3 serves to align 2 and 2A. The inner gear A has a plurality of holes 9 to reduce end friction against the plates 6 and 7.

The teeth 10 of the gear B have threaded ends 11 and nuts 12 to bolt the end plates 6 and 7 in position. The material 10A adjacent to the outer portion of the gear teeth 10 and serving to form the outer gear tooth spaces may be made of cast metal. The shoulders 13 and the plate flanges 6A and 7A together with the teeth 10 serve to properly locate the teeth 10—10A of the gear B. The teeth 10—10A may be individual teeth with spaces 15 between them or all of one piece as shown at 15B in FIG. 1. The spaces 15 should be a few thousandths of an inch to allow for expansion and contraction in large gears. In small gears teeth and tooth space material may be of one piece. Separate teeth permit the use of smaller molds and more accurate molding.

Figure 2:
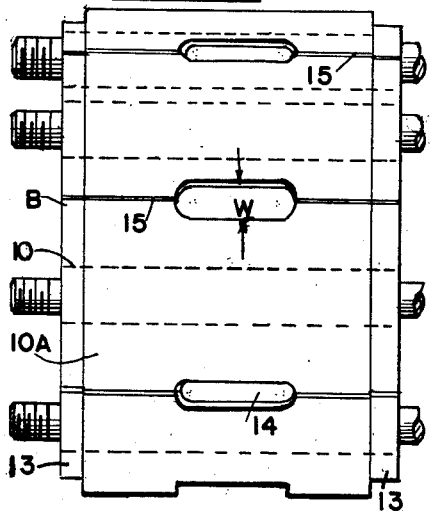
FIGURE 2 is a right hand view of the outer gear in FIG. 1.

When handling gases radial openings 14 (FIG. 2) are sufficiently long for the flow of gas into and out of gear tooth chambers. For liquids they should be longer as indicated at 14A in FIG. 3 where the opening extended from one plate flange 6A to the other at 7A. These openings can have different widths, W in FIG. 2 and X in FIG. 4. The radial thickness T in FIG. 1 can also be varied. That is, from zero in FIG. 5 to that shown in FIG. 1.

In FIG. 1 the gear A can be made of dense gray cast iron or of a hardened steel alloy. The outer gear teeth 10 can be of hardened steel also.

Figure 4:
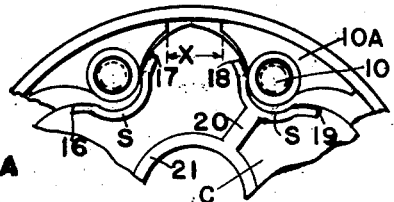
FIGURE 4 is a partial end view of each gear with inserts in the tooth spaces of the inner gear.

The inner gear C in FIG. 4 has tooth space inserts S which extend from 16 to 17 and from 18 to 19 so that gear tooth 10 maintains a driving contact across the full mesh region until the next tooth 10 engages the next inner gear insert S. That is, one insert is always in contact with an outer gear tooth and being driven by it in the full mesh region. These inserts S may be bonded to the body material of the gear C or they may be held in position by a leg 20 connected to the bore 21 forming a spider. The outer surfaces of the inserts S are contoured to maintain continuous driving relations at full mesh with each of the outer gear teeth 10 in accordance with Patents Nos. Re. 21,316 and 2,666,336 to Myron F. and Francis A. Hill.

The relatively small outer gear teeth 10 have less sliding friction while driving the inserts S across full mesh than would large teeth. The drive is located closer to the gear centers and closer to the point of tangency of the pitch or ratio circles of the gears. The radial in and out travel of a tooth in a tooth space is less and the length of tooth contact is shorter. With the driving range thus reduced, the convex flanks 22 of the inner gear teeth have a wiping or fluid pressure holding engagement with the teeth 10 of the outer gear instead of a driving engagement.

The Gerotor inner gear 23 in FIG. 5 has convex teeth 24. The tips 25 lie inside (in a radial sense) of the true generated tooth tip 26 shown in dashed lines. This provides a crescent shaped space of no tooth engagement at open mesh extending from 29C thru 28 to 29D. The width of this crescent space at 28 is sufficient to allow for bearing tolerances. The outer gear teeth 29 have a generative relation for driving purposes with the inner gear tooth space inserts 30 from 32 to 33. The material of 31 of the outer can be made of rigidly moldable material. The driving range between the inserts 30 and the teeth 29 are limited to the full mesh region as in FIG. 4. The surfaces of the convex teeth of the gear 23 can be made of die cast metal or ceramic.

The body of the inner gear 23 is undercut at 23A (FIGS. 6 and 7) to reduce end friction with the closure plates 32A and 33A. Radial openings 37 in FIG. 5 serve as ports for gear chambers during their opening and closing. The pin 29B and the tooth 29 serve in FIG. 5 to properly locate the teeth and material forming the tooth spaces of the outer gear between the end plates 33A and 32A. The shaft 39 is keyed to the inner gear 23 and drives it. This causes the inserts 30 to drive the outer gear teeth 29 in the full mesh region. The driving relation is the same as but the reverse of that described for FIGS. 1 and 4. Shaft 39 rotates inside of the eccentric members 34 and 35. The outside of these same members journal the end plates 32A and 33A.

FIG. 9 shows a 4 tooth inner gear 38 inside a 5 tooth outer gear 40. The inner gear 38 has its convex and concave tooth and tooth space surfaces composed of rigidly molded material 39. The outer gear has its teeth and space curves also covered with rigidly molded material. If preferred, one of these gears can be made of the same material throughout. The molded surfaces 41 may be separated at 42 or they may all be of one piece as indicated at 43. The gear 40 may be homogeneous with the back plate 44.

FIGS. 11 and 12 show a 7 tooth inner gear 45 inside a 9 tooth outer gear 47. The teeth and tooth spaces of the outer gear may have molded surfaces at 48, 49, and 50. The molded material may have a space 55 similar to 15 in FIG. 2 or be all of one piece as indicated at 59. The inner gear 45 can be of cast iron, or steel or it may have its teeth and tooth spaces covered with rigidly moldable material as indicated at 56, 57 and 58. The crescent 61 in the open mesh region between the gears may have its surfaces covered with material at 62 and 63. The driving relation between the teeth of one gear and those of the other is in the full mesh region. Most of the pumping is caused by the teeth entrapping fluids between their teeth, tooth spaces and the inner and outer surfaces of the crescent. Either gear can drive the other. I prefer the outer gear drive because of the larger capacity per revolution.

My invention consists in the use of different metals for teeth and tooth space surfaces from other parts of gears used for pumping fluids. The materials selected for teeth of one gear driving the other gear by engaging the tooth spaces of the other gear in the region of full mesh engagement should provide the most durable combination possible. This permits other parts of the gears to be of cheaper manufacture.

What I claim is:

In rotary mechanism for handling fluids, a pair of gears in which a first gear drives a second gear, each having rigid teeth and tooth space surfaces, and having tooth surfaces of said first gear composed of a different material from that forming its tooth space surfaces, and having the material forming the tooth space surfaces of said second gear different from the material composing the surfaces of the teeth of said second gear, the teeth of said first gear composed of a ferrous metal selected from a group consisting of iron and steel and the material forming the tooth spaces of said first gear composed of die metal, and having the material forming the tooth space surfaces of said second gear composed of a ferrous metal selected from a group consisting of iron and steel and having said second gear teeth composed of die metal.

References Cited in the file of this patent

UNITED STATES PATENTS

| | | |
|---|---|---|
| 65,992 | Bazin | June 25, 1867 |
| 1,021,180 | Clifton | Mar. 26, 1912 |
| 1,358,191 | Fitzpatrick | Nov. 9, 1920 |
| 1,524,555 | Kempton | Jan. 27, 1925 |
| 1,739,139 | Haight | Dec. 10, 1929 |
| 1,926,692 | Tarbox | Sept. 12, 1933 |
| 1,993,721 | Pigott | Mar. 5, 1935 |
| 2,029,333 | Miller | Feb. 4, 1936 |
| 2,240,056 | Schmitz | Apr. 29, 1941 |
| 2,291,354 | Sibley | July 28, 1942 |
| 2,336,479 | Graef | Dec. 14, 1943 |
| 2,364,469 | Orr | Dec. 5, 1944 |
| 2,484,789 | Hill et al. | Oct. 11, 1949 |
| 2,530,767 | Hamil | Nov. 21, 1950 |
| 2,601,397 | Hill et al. | June 24, 1952 |
| 2,621,603 | Thomas | Dec. 16, 1952 |
| 2,629,161 | Kistler | Feb. 24, 1953 |
| 2,672,824 | Quintilian | Mar. 23, 1954 |
| 2,720,119 | Sherman | Oct. 11, 1955 |
| 2,753,810 | Quintilian | July 10, 1956 |
| 2,776,625 | Cook | Jan. 8, 1957 |
| 2,833,224 | Meyer et al. | May 6, 1958 |
| 2,848,952 | Wakeman | Aug. 26, 1958 |
| 2,880,676 | Succop | Apr. 7, 1959 |

OTHER REFERENCES

Publication: Plastics Engineering Handbook, Reinhold Publishing Corp., 1954, chapter 14 (see pages 479 and 480).

S.A.E. Journal, November 1960 (publication), page 54.